United States Patent
Ito et al.

(10) Patent No.: US 8,987,366 B2
(45) Date of Patent: Mar. 24, 2015

(54) SEAL RING

(75) Inventors: Hiroshi Ito, Niigata (JP); Akihiro Oowada, Niigata (JP)

(73) Assignee: Kabushiki Kaisha Riken, Tokyo (JP)

( * ) Notice: Subject to any disclaimer, the term of this patent is extended or adjusted under 35 U.S.C. 154(b) by 0 days.

(21) Appl. No.: 13/983,215

(22) PCT Filed: Jan. 13, 2012

(86) PCT No.: PCT/JP2012/050637
§ 371 (c)(1),
(2), (4) Date: Oct. 11, 2013

(87) PCT Pub. No.: WO2012/096387
PCT Pub. Date: Jul. 19, 2012

(65) Prior Publication Data
US 2014/0031475 A1  Jan. 30, 2014

(30) Foreign Application Priority Data
Jan. 14, 2011  (JP) .................. 2011-006156

(51) Int. Cl.
*C08K 3/04* (2006.01)
*F16J 15/34* (2006.01)
*F16J 15/32* (2006.01)
*C08K 3/30* (2006.01)
*C08K 7/14* (2006.01)
*C08K 7/24* (2006.01)
*C08K 7/06* (2006.01)

(52) U.S. Cl.
CPC .......... *F16J 15/3496* (2013.01); *F16J 15/3208* (2013.01); *C08K 3/04* (2013.01); *C08K 3/30* (2013.01); *C08K 7/14* (2013.01); *C08K 7/24* (2013.01); *C08K 7/06* (2013.01)
USPC ............ 524/496; 524/406; 524/494; 524/495

(58) Field of Classification Search
USPC .................... 524/406, 494, 495, 496
See application file for complete search history.

(56) References Cited

U.S. PATENT DOCUMENTS

| 5,789,523 A * | 8/1998 | George et al. ................. 528/170 |
| 6,943,137 B2 * | 9/2005 | Saito ............................. 508/109 |
| 2004/0242774 A1 | 12/2004 | Fujimura et al. |
| 2008/0194747 A1 * | 8/2008 | Otterstedt et al. ............ 524/284 |
| 2010/0029833 A1 * | 2/2010 | Krizan et al. ................. 524/496 |

FOREIGN PATENT DOCUMENTS

| JP | 7-53830 A | 2/1995 |
| JP | 2004-352790 A | 12/2004 |
| JP | 2005-264068 A | 9/2005 |
| JP | 2006-283898 A | 10/2006 |
| JP | 2007-191576 A | 8/2007 |
| JP | 2008-37933 A | 2/2008 |

OTHER PUBLICATIONS

International Search Report for PCT/JP2012/050637 dated Feb. 28, 2012.

* cited by examiner

*Primary Examiner* — Peter Szekely
(74) *Attorney, Agent, or Firm* — Kenealy Vaidya LLP

(57) ABSTRACT

Provided is a seal ring manufactured from a mixture containing a soft resin including at least one of a thermoplastic elastomer and a dynamic crosslinked resin, and a hard resin including a thermoplastic resin. With this seal ring, the adhesion to the inner peripheral surface of a housing can be maintained in a no-load state where a hydraulic pressure is not generated even after use as a one-piece type for an extended period of time and oil leakage can be effectively prevented. The mixture constituting the seal ring preferably has a compression permanent deformation of 95% or lower after immersion in an automatic transmission fluid at 150° C. for 100 hours.

4 Claims, 2 Drawing Sheets

US 8,987,366 B2

SEAL RING

This application is a U.S. national phase filing under 35 U.S.C. §371 of PCT Application No. PCT/JP2012/050637, filed Jan. 13, 2012 and claims priority under 35 U.S.C. §119 to Japanese patent application no. 2011-006156, filed Jan. 14, 2011, the entireties of both of which are incorporated by reference herein.

TECHNICAL FIELD

The present invention relates to a seal ring, and in particular, to a seal ring used in a continuously variable transmission (hereinafter referred to as "CVT") which continuously changes a gear by changing the diameter of a pulley.

BACKGROUND ART

In a hydraulic CVT, the groove width of a pulley is correlatively changed depending on the hydraulic pressure in a hydraulic chamber, whereby the diameter of the pulley is changed to continuously change a gear. In general, a fixed pulley is integrally formed with a shaft for driving, and a movable pulley is formed in a housing that reciprocates along the shaft. A hydraulic chamber is provided in the movable pulley. The hydraulic pressure in the hydraulic chamber is controlled to allow the movable pulley to be separated from, or be brought into contact with, the fixed pulley. Thus, the width of grooves formed in both the pulleys is increased or decreased to increase or decrease the radius of rotation of a belt wound around the pulleys. This configuration transmits power to change a gear ratio. In order to fill the hydraulic chamber with an oil and generate a hydraulic pressure, a seal ring is attached to a shaft groove formed in the outer peripheral surface of the shaft.

In the CVT described above, when an engine is stopped, an oil pump is stopped. For this reason, a hydraulic pressure is not generated and a load is not applied. In the conventional seal ring, sufficient sealing performance is achieved in a state where a hydraulic pressure is generated, but an adhesion to the inner peripheral surface of the housing is not achieved in a no-load state. As a result, the oil of the hydraulic chamber is escaped. When the engine is re-started in such a state, it takes a long time until the hydraulic chamber is filled with the oil. When the engine is started in a state where the hydraulic chamber is not filled with the oil, a rotating part of the CVT may be damaged by seizure. Therefore, a seal ring which can reduce oil leakage from the hydraulic chamber even in a no-load state where a hydraulic pressure is not generated is required.

As a seal ring for a CVT, a combined seal ring including an endless resin ring 7 that has a substantially rectangular cross section and is disposed on the outer peripheral side and an O ring 6 that is disposed on the inner peripheral side and imparts an expansive power to the resin ring, as shown in FIG. 1, has been used. In general, as a material for the resin ring 7, a polytetrafluoroethylene (PTFE) resin to which a filler is added, or the like, is used, and as a material for the O ring 6, a rubber-like elastic body is used.

In the conventional combined seal ring, the O ring 6 and the resin ring 7 are pushed and collapsed, so as to be installed in a space between a groove bottom 8 and the inner face 4a of a housing 4. Therefore, when a shaft 3 to which the O ring 6 and the resin ring 7 are attached is inserted in the housing 4, the assembly resistance becomes large. Accordingly, it is necessary to introduce a press-fitting device and assemble the housing 4. This causes a problem in which the manufacturing cost is increased and a defect of assembly of a seal ring cannot be detected. In order to solve the problems such as the fitting and cost of the combined seal ring, the application of a one-piece seal ring is required.

Since a maximum hydraulic pressure of about 7 MPa is applied to the hydraulic chamber in the CVT, a seal ring having excellent wear resistance and sealing performance under a high hydraulic pressure is required. In consideration of increase in temperature due to generation of heat during high-speed running and use in the cold district, a seal ring is required to have resistance in a temperature region of −40° C. to 150° C. As a material for the seal ring, a material in which a fluorine-containing resin such as polytetrafluoroethylene (PTFE), modified polytetrafluoroethylene, and ethylene tetrafluoroethylene (ETFE) is charged with an additive such as carbon powder and carbon fibers is used.

For example, Patent Literature 1 discloses a composition, in which carbon black having a certain amount of DBP absorption is blended in a PTFE-based resin, as a resin composition applicable to a CVT. When a seal ring having the composition disclosed in Patent Literature 1 absorbs an oil, the seal ring is swollen and fills a space formed in a radial direction of the seal ring by creep deformation at a high temperature, and the low-temperature sealing performance can thereby be improved. Patent Literature 1 describes that the seal ring has excellent sealing performance even at a low temperature immediately after start of running of a hydraulic pressure device. Further, the seal ring of Patent Literature 1 is used for high contact pressure types such as CVT. Therefore, Patent Literature 1 suggests that, in order to improve wear resistance and creep resistance, carbon fibers and graphite can be blended.

Use of the seal ring of Patent Literature 1 may enable a decrease in oil leakage at a low temperature. However, the above described configuration includes a PTFE-based resin as a main component. Therefore, when a pressure is applied in an automatic transmission fluid at a high temperature, the seal ring is plastically deformed. When an engine is stopped and went into a no-load state after running, it is difficult to maintain the adhesion state (adhesion) to the inner peripheral surface of the housing. Further, it is difficult to prevent the oil leakage from the hydraulic chamber.

Patent Literature 1: Japanese Patent Application Laid-Open No. 2006-283898

DISCLOSURE OF THE INVENTION

Problems to be Solved by the Invention

The present invention has been made in view of the circumstances described above. It is an object of the present invention to provide a seal ring in which the adhesion to the inner peripheral surface of a housing can be maintained in a no-load state where a hydraulic pressure is not generated even after use as a one-piece type for an extended period of time and oil leakage can be effectively prevented.

Means for Solving the Problems

As a result of intensive studies conducted in view of the aforementioned problems, the present inventors have found that a composition comprising a mixture containing a soft resin comprising at least one of a thermoplastic elastomer and a dynamic crosslinked resin, and a hard resin comprising a thermoplastic resin exhibits a low compression permanent deformation after immersion in an automatic transmission fluid at a high temperature, and a seal ring made of the composition can maintain the adhesion to the inner peripheral surface of a housing in a no-load state where a hydraulic pressure is not generated even after use as a one-piece ring for an extended period of time, and can effectively prevent oil leakage. Accordingly, the present invention has been completed. More specifically, the seal ring of the present invention is made of a mixture containing a soft resin comprising at least one of a thermoplastic elastomer and a dynamic crosslinked resin, and a hard resin comprising a thermoplastic resin.

Effects of the Invention

The seal ring of the present invention is made of a material having a low compression permanent deformation after immersion in an automatic transmission fluid at a high temperature, that is, a material which tends to return to the original state after freeing the compressive load. Therefore, the adhesion to the inner peripheral surface of a housing can be maintained even after use as a one-piece ring for an extended period of time. For this reason, the seal ring can effectively prevent oil leakage from the hydraulic chamber even in a no-load state where a hydraulic pressure is not generated over a long period of time. Furthermore, since the seal ring of the present invention is made of a flexible material, the seal ring is easily attached to a ring groove, and can be used as a one-piece type. Therefore, the time for attachment can be largely shortened.

MODE FOR CARRYING OUT THE INVENTION

Figure 1:
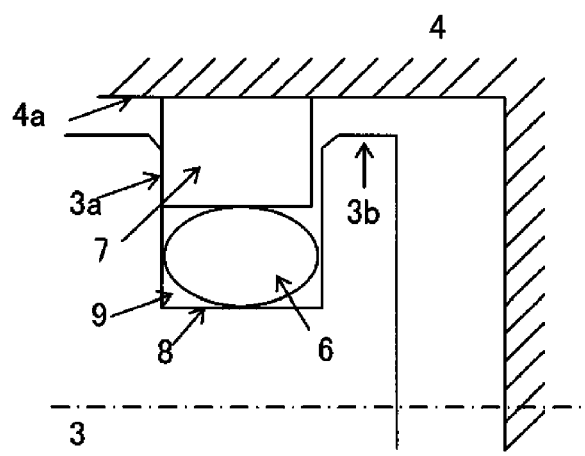
FIG. 1 is a cross-sectional view illustrating a state where a conventional seal ring is attached.

Hereinafter, the seal ring of the present invention will be decreased in detail.
The seal ring of the present invention is made of a mixture containing a soft resin comprising at least one of a thermoplastic elastomer and a dynamic crosslinked resin, and a hard resin comprising a thermoplastic resin. The seal ring of the present invention made of such materials has a low compression permanent deformation after immersion in an automatic transmission fluid at a high temperature. Therefore, the seal ring exhibits excellent sealing performance even in a no-load state when an engine is stopped. The compression permanent deformation of the mixture constituting the seal ring of the present invention, that is, the compression permanent deformation after immersion in an automatic transmission fluid at 150° C. for 100 hours, which is measured by the method described below, is preferably 95% or lower, more preferably 85% or lower, and further preferably 80% or lower. When the compression permanent deformation is defined within this range as described above, the adhesion to the inner peripheral surface of a housing is maintained after running the engine for an extended period of time, and the sealing performance in a no-load state is further improved.
The hardness of the mixture constituting the seal ring of the present invention, that is, the shore hardness A measured by the method described below is preferably 60 to 98, and more preferably 70 to 95. When the shore hardness is defined within this range, the seal ring is unlikely to be deformed due to the hydraulic pressure during use, and high sealing performance can be maintained after running for an extended period of time. In addition, since the seal ring is easily attached to a shaft groove, the fitting of the seal ring is further improved.

Examples of the soft resin used in the present invention may include a thermoplastic elastomer and a dynamic crosslinked resin. The surface hardness of the soft resins is expressed as shore hardness A, and is preferably 60 to 90.
Examples of the thermoplastic elastomer may include a polyester-based elastomer, a polyolefin-based elastomer, a fluorine-containing elastomer, a silicone-based elastomer, a butadiene-based elastomer, a polyamide-based elastomer, a polystyrene-based elastomer, and a urethane-based elastomer. These thermoplastic elastomers may be used singly, or in a mixture of two or more kinds. Among these thermoplastic elastomers, a polyester-based elastomer and a polyamide-based elastomer are preferable since the injection-molding property and heat resistance thereof are excellent.
Examples of commercial products of a polyester-based elastomer may include "Hytrel" available from DU PONT-TORAY CO., LTD., "PELPRENE" available from TOYOBO CO., LTD., and "PRIMALLOY" available from Mitsubishi Chemical Corporation. Examples of commercial products of a polyamide-based elastomer may include "pebax" available from ARKEMA, and "UBESTAXPA" available from Ube Industries, Ltd.
The dynamic crosslinked resin has a structure in which a crosslinked rubber phase is dispersed in a thermoplastic resin phase. Examples of a thermoplastic resin used in the dynamic crosslinked resin may include, but not particularly limited to, polyester and polyamide (PA). On the other hand, examples of rubber may include, but not particularly limited to, a natural rubber, cis-1,4-polyisoprene, high cis-polybutadiene, a styrene-butadiene copolymer rubber, an ethylene-propylene rubber (EPM), an ethylene-propylene diene rubber (EPDM), a chloroprene rubber, a butyl rubber, a halogenated butyl rubber, an acrylonitrile-butadiene copolymer rubber, and an acrylic rubber.
The dynamic crosslinked resin can be produced by publicly known methods. For example, a crosslinking agent is mixed in an uncrosslinked rubber component in advance, and a thermoplastic resin component and the uncrosslinked rubber component are melt-kneaded with a twin screw extruder, to disperse and crosslink the rubber component at once. Such a dynamic crosslinked resin is available as a commercial product. Examples of commercial products of a dynamic crosslinked resin in which an acrylic rubber is dispersed in a polyester resin may include "ETPV" available from DuPont Co., and "NOFALLOY" (TZ660-7612-BK, TZ660-6602-BK, and the like) available from NOF CORPORATION. Examples of commercial products of a dynamic crosslinked resin in which an acrylic rubber is dispersed in a polyamide resin may include "ZEOTHERM" available from ZEON CORPORATION.
The amount of the soft resin to be contained is preferably 60% by mass to 95% by mass with respect to the total amount of the resin composition constituting the seal ring, and more preferably 80% by mass to 95% by mass. When the amount of the soft resin is defined within the range, the compression permanent deformation of the resin composition becomes lower, and excellent sealing performance can be achieved in a no-load state.
The hard resin used in the present invention is preferably a thermoplastic resin. The surface hardness of the hard resin is expressed as shore hardness D, and is preferably 70 or larger, and more preferably 90 or larger. Examples of the thermoplastic resin may include polyethylene terephthalate (PET), polybutylene terephthalate (PBT), polytrimethylene terephthalate (PTT), polyethylene naphthalate (PEN), polyester, polypropylene (PP), a syndiotactic polystyrene resin, polyoxymethylene (POM), polyamide (PA), polycarbonate (PC), polyphenylene ether (PPE), polyphenylene sulfide (PPS), polyimide (PI), polyamide imide (PAI), polyether imide (PEI), polysulfone (PSU), polyether sulfone, polyketone (PK), polyether ketone (PEK), polyether ether ketone (PEEK), polyether ketone ketone (PEKK), polyarylate (PAR), polyether nitrile (PEN), polytetrafluoroethylene (PTFE), and vinylidene fluoride (PVDF). These resins may be a copolymer or a modified body, and two or more kinds thereof may be mixed. In consideration of injection-molding property and heat resistance, among the thermoplastic resins, PBT, polyester, PA, PPS, and PVDF are preferable.

The amount of the hard resin to be added is preferably 5% by mass to 40% by mass with respect to the total amount of the resin composition constituting the seal ring, and more preferably 5% by mass to 20% by mass.

An inorganic filler may be added to the seal ring of the present invention. Examples of the inorganic filler may include fibrous inorganic fillers such as fibrous glass, carbon fibers, carbon nanotubes, alumina fibers, potassium titanate fibers, boron fibers, and silicon carbide fibers. When the fibrous inorganic filler is added to the seal ring, the mechanical strength and creep resistance of the seal ring are improved, and excellent sealing performance can be obtained. Therefore, the seal ring can be used in a region where the PV value is high. Among the fibrous inorganic fillers, fibrous glass, carbon fibers, and carbon nanotubes are preferable. Carbon nanotubes exert a reinforcement function as a fibrous inorganic filler, and additionally are useful as a filler for improving the sliding property, like the inorganic filler described below.

In the present invention, other inorganic fillers may be added to improve the sliding property. Example of the inorganic fillers may include calcium carbonate, montmorillonite, bentonite, talc, silica, isinglass, mica, barium sulfate, calcium sulfate, calcium silicate, molybdenum bisulfide, glass beads, graphite, fullerene, carbon (amorphous) powder, anthracite powder, aluminum oxide, titanium oxide, magnesium oxide, potassium titanate, and boron nitride.

The amount (total amount) of the inorganic fillers to be added is preferably 5% by mass to 10% by mass with respect to the total amount of the resin composition constituting the seal ring. When carbon nanotubes are added as the inorganic filler, the amount thereof is preferably 1% by mass to 5% by mass with respect to the total amount of the resin composition constituting the seal ring. When the inorganic fillers are added in an amount falling within this range, excellent mechanical strength and sliding property can be obtained. In addition to this, excellent sealing performance can be maintained over a long period of time.

A method for mixing the materials is not particularly limited, and any known method is used. Examples thereof may include heating, melting, and kneading with a single screw extruder, a twin screw extruder, a roll, a kneader, a banbury mixer or the like. Alternatively, a commercially available high-shear molding processing machine can be used.

In order to reliably prevent oil leakage in a no-load state, an endless seal ring having no abutment joint is preferably used in the present invention. Since the materials for the seal ring of the present invention are flexible, the fitting of the seal ring is excellent even in an endless shape. Furthermore, a seal ring in a one-piece shape is attached more easily. However, an abutment joint may be provided according to the application. In this case, the shape of abutment joint is not particularly limited, and a known abutment joint such as a straight abutment joint, an angled abutment joint, a stepped abutment joint, a double angled abutment joint, a double cut abutment joint, or a triple stepped abutment joint can be used.

EXAMPLES

The present invention will be described further in detail by way of the following Examples, but the present invention is not limited to these Examples.

Examples 1 to 17

Materials were put in a twin screw extruder at a blending proportion shown in Table 1, and were kneaded under a condition which fell within ranges of 270 to 350° C. and 100 to 300 rpm and was properly set according to the composition, to thereby obtain a resin composition for the seal ring of the present invention. As the materials, the following commercial products were used. The resulting resin composition was injection-molded to produce various measurement samples. The surface hardness, compression permanent deformation, and amount of static leakage were measured in accordance with the following methods. The results are shown in Table 1.

A. Soft Resin

A-1. Polyester-based elastomer: Hytrel (available from DU PONT-TORAY CO., LTD.)

A-2. Polyamide-based elastomer: pebax (available from ARKEMA)

A-3. Polyester resin/acrylic rubber-based dynamic crosslinked resin: NOFALLOY TZ660-7612-BK, hardness: Shore A75 (available from NOF CORPORATION)

A-4. Polyester resin/acrylic rubber-based dynamic crosslinked resin: ETPV 90A01 NC010, hardness: Shore A87 (available from DuPont Co.)

A-5. Polyester resin/acrylic rubber-based dynamic crosslinked resin: ETPV60A01L NC010, hardness: Shore A64 (available from NOF CORPORATION)

B. Hard Resin

B-1. Polybutylene terephthalate: TORAYCON 1401-X06 (available from TORAY INDUSTRIES, INC.)

B-2. Polyphenylene sulfide: TORELINA A900 (available from TORAY INDUSTRIES, INC.)

B-3. Vinyliden fluoride resin: Kureha KF Polymer T#850 (available from KUREHA CORPORATION)

B-4. Liquid crystal polyester resin: SIVERAS (available from TORAY INDUSTRIES, INC.)

C: Inorganic Filler

C-1. Fibrous glass: MF06JB1-20 (available from Asahi Fiber Glass Co., Ltd.)

C-2. Carbon fiber: S-232 (available from Osaka Gas Chemicals Co., Ltd.)

C-3. Molybdenum bisulfide: Z powder (available from DAITOU CO, LTD.)

C-4. Graphite: GA-50 (available from Nippon Techno-Carbon Co., Ltd.)

C-5. Multi-layered carbon nanotubes: Flo Tube 9000 (available from CNano Technology Limited)

Comparative Example 1

70% by mass of PTFE resin (Teflon 7J available from Du Pont-Mitsui Fluorochemicals Company, Ltd.), 5% by mass of carbon black (#3600B available from Mitsubishi Chemical Corporation), and 25% by mass of graphite (ACP available from Nippon Graphite Industries, ltd.) were mixed, and the mixture was pressure-molded to produce a sample. The compression permanent deformation and amount of static leakage of the obtained sample were measured as in Example 1. The compression permanent deformation was 100. The amount of static oil leakage exceeded 100 cc after 1 hour. At that time, the measurement was stopped.

Comparative Example 2

95% by mass of polyester resin/acrylic rubber-based dynamic crosslinked resin (ETPV 90A01 NC010, available from DuPont Co.) and 5% by mass of multi-layered carbon nanotubes (FloTube 9000 available from CNano Technology Limited) were kneaded in the same manner as in Example 1, to obtain a composition for a seal ring. The obtained resin composition was injection-molded to produce a measurement sample. The surface hardness, compression permanent deformation, and amount of static oil leakage of the measurement sample were measured as in Example 1. The results are shown in Table 1.

Comparative Example 3

A PTFE resin (Teflon 7J available from Du Pont-Mitsui Fluorochemicals Company, Ltd.) was pressure-molded without addition of an inorganic filler to produce a sample. The compression permanent deformation and amount of static oil leakage of the obtained sample were measured as in Example 1. The compression permanent deformation in this Comparative Example was 100, which is the same as in Comparative Example 1. The amount of static leakage exceeded 100 cc before the period of 1 hour. At that time, the measurement was stopped.

Comparative Example 4

A polyester resin/acrylic rubber-based dynamic crosslinked resin (ETPV 90A01 NC010 available from DuPont Co.) was injection-molded to produce a measurement sample. The surface hardness, compression permanent deformation, and amount of static oil leakage of the measurement sample were measured as in Example 1. The results are shown in Table 1.

(Measurement of Surface Hardness)

Shore hardness was measured in accordance with JIS K7215.

(Measurement of Compression Permanent Deformation Cs)

Measurement of compression permanent deformation Cs was performed as follows with reference to JIS K6262. A specimen of 5 mm in height, 15 mm in width, and 2 mm in thickness, obtained by injection-molding was put in a compression device, was compressed to a compression rate of 25%, and immersed in an automatic transmission fluid (ATF), which had been adjusted to 150° C. in advance, for 100 hours. After completion of heat treatment, the specimen was taken out from the ATF, and the ATF on the surface of specimen detached from the compression device was wiped off. The specimen was allowed to stand for 30 minutes at room temperature. After then, the thickness ($t_2$) in the central region of the specimen was measured. From $t_2$ at this time, the compression permanent deformation Cs was calculated by the expression 1.

$$Cs = (t_0 - t_2)/(t_0 - t_1) \times 100 \quad \text{(Expression 1)}$$

$t_0$: original thickness of specimen (mm)
$t_1$: thickness of spacer (mm)
$t_2$: thickness 30 minutes after test (mm)

(Measurement of Amount of Oil Leakage in Static State)

Each of the resin compositions for a seal ring in Examples 1 to 17 and Comparative Examples 1 to 4 was used to produce a seal ring having no abutment joint. In Examples 1 to 17 and Comparative Examples 2 and 4, injection-molding was adopted, and in Comparative Examples 1 and 3, pressure-molding was adopted. The resulting seal ring was attached to a shaft groove provided in the outer peripheral surface of a shaft, and was installed in a static leakage performance test device. A hydraulic chamber was charged with 165 cc of ATF. ATF leaked from the seal ring at room temperature (oil temperature: 25° C.) in a static state was collected from an oil drainage groove. The cumulative amount of oil leakage for 7 days was measured. The results of the measurement are shown in Table 1 as an amount of static oil leakage at the initial stage. The size of the seal ring was set so that the compression rate was 25% with the seal ring attached to the shaft groove.

Each seal ring was attached to the shaft groove provided in the outer peripheral surface of the shaft, and the housing was reciprocated at a hydraulic pressure of 4.0 MPa, an oil temperature of 150° C., and a stroke rate of 10 mm/s over a cumulative distance of 1 km. Then the amount of oil leakage was measured by the above-described method. The results of the measurement are shown in Table 1 as an amount of static oil leakage after running.

In Example 1 using a polyester-based elastomer as a soft resin, PPS as a hard resin, and fibrous glass and graphite as inorganic fillers, the compression permanent deformation was 98%, and the amount of static oil leakage at the initial stage was 4.3 cc. The compression permanent deformation was less than that in Comparative Example 1 by 2%. Thus, a large decrease in the amount of static oil leakage was confirmed. Further, in Example 2 using a polyamide-based elastomer as a soft resin, it was revealed that the same effect as in Example 1 could be obtained. Further, in Examples 3, 4, and 5 each using a dynamic crosslinked resin as a soft resin, the compression permanent deformations were 94%, 92%, and 96%, respectively, which were less than that in Example 1. A further decrease in the amounts of static oil leakage was confirmed.

Moreover, in Comparative Example 2 using only a dynamic crosslinked resin and an inorganic filler, the compression permanent deformation was 77%, and the amount of static oil leakage at the initial stage was 0 cc. They were less than those in Examples 1 to 5. However, the amount of static oil leakage after running in Comparative Example 2 was largely increased to 100 cc. On the contrary, in Examples 1 to 5, the amount of static oil leakage even after running was less than 10 cc, and thus a large change in the amount was not recognized. Therefore, maintenance in the sealing performance in a no-load state after running was confirmed. This may be because the resin composition for the seal ring of the present invention has less compression permanent deformation and excellent mechanical strength such as creep resistance and wear resistance is obtained by addition of a hard resin.

In all Examples 4 and 6 to 8 using the same kinds of dynamic crosslinked resin and inorganic filler and a different kind of hard resin, excellent sealing performance in a no-load state was confirmed. In particular, in Examples 4 and 7 using PPS and PVDF as a hard resin, more excellent sealing performance was confirmed.

As seen from Examples 7 and 9, it was revealed that, even when fibrous inorganic filler was changed from fibrous glass into carbon fiber, the same excellent sealing performance was obtained. As seen from Examples 7 and 10, it was revealed that, even when fibrous inorganic filler was changed from graphite into molybdenum bisulfide, the same excellent sealing performance was obtained.

In Examples 11 to 14, the same kinds of dynamic crosslinked resin, hard resin, and carbon nanofibers were used at a different composition ratio to produce each sample having a different value of compression permanent deformation. As seen from the results of Examples 11 to 14, it was revealed that as the compression permanent deformation was lower, the excellent sealing performance in a no-load state even after running was maintained. In particular, when the compression permanent deformation was 95% or lower, excellent sealing performance was recognized. Further, when the compression permanent deformation was 85% or lower, and preferably 80% or lower, the seal properties were more excellent. This may be because if a material having a lower compression permanent deformation is used, the adhesion to the inner peripheral surface of a housing is maintained even when the outer peripheral surface of the seal ring is worn during running.

In Examples 15, 16, and 17 in which an inorganic filler was excluded from the compositions in Examples 3, 7, and 13, respectively, the compression permanent deformations tended to be lower than those in Examples 3, 7, and 13. In the compositions in Examples 15 to 17 in which an inorganic filler was not contained, the compressive stress would be unlikely to be concentrated to a particular part, and would uniformly be distributed to the entire materials. Thus, it is assumed that when the compressive load is released, the state easily returns to the original state. In a composition containing no inorganic filler, the sealing performance in a no-load state is further improved. Even under a use condition in which a compressed rate during pressurization is large, excellent sealing performance is exerted in a no-load state. Such a resin material is suitable for an application in which a mechanical load is small and the sealing performance is important.

On the other hand, an inorganic filler is effective for improvement of sliding properties such as mechanical strength and wear resistance of the resin material. Therefore, when an inorganic filler is added to the seal ring of the present invention, not only excellent effect of preventing leakage in a no-load state is exhibited, but also excellent sliding property even at a high hydraulic pressure is exerted.

TABLE 1

|   |   |   | Example |   |   |   |   |   |   |   |   |   |
|---|---|---|---|---|---|---|---|---|---|---|---|---|
|   |   |   | 1 | 2 | 3 | 4 | 5 | 6 | 7 | 8 | 9 | 10 |
| A | Soft Resin (mass %) | A-1 | 73 | | | | | | | | | |
|   |   | A-2 | | 73 | | | | | | | | |
|   |   | A-3 | | | 73 | | | | | | | |
|   |   | A-4 | | | | 73 | | 73 | 73 | 73 | 73 | 73 |
|   |   | A-5 | | | | | 73 | | | | | |
| B | Hard Resin (mass %) | B-1 | | | | | | | | | 18 | |
|   |   | B-2 | 18 | 18 | 18 | 18 | 18 | | | | | |
|   |   | B-3 | | | | | | | 18 | | 18 | 18 |
|   |   | B-4 | | | | | | | | 18 | | |
| C | Inorganic Filler (mass %) | C-1 | 4.5 | 4.5 | 4.5 | 4.5 | 4.5 | 4.5 | 4.5 | 4.5 | | 4.5 |
|   |   | C-2 | | | | | | | | | 4.5 | |
|   |   | C-3 | | | | | | | | | | 4.5 |
|   |   | C-4 | 4.5 | 4.5 | 4.5 | 4.5 | 4.5 | 4.5 | 4.5 | 4.5 | 4.5 | |
|   |   | C-5 | | | | | | | | | | |
|   | Shore Hardness | | 99 | 100 | 99 | 98 | 96 | 95 | 94 | 97 | 94 | 93 |
|   | Compression Permanent Deformation (%) | | 98 | 98 | 94 | 92 | 96 | 92 | 88 | 95 | 90 | 90 |
|   | Amount of Static Oil Leakage (cc) | Initial | 4.3 | 6.7 | 1.4 | 0.8 | 2.6 | 1.2 | 0.0 | 1.6 | 0.0 | 0.0 |
|   |   | After Running | 6.9 | 9.1 | 3.2 | 2.1 | 4.4 | 2.7 | 2.2 | 3.3 | 2.6 | 2.5 |

|   |   |   | Example |   |   |   |   |   |   | Comparative Example |   |
|---|---|---|---|---|---|---|---|---|---|---|---|
|   |   |   | 11 | 12 | 13 | 14 | 15 | 16 | 17 | 2 | 4 |
| A | Soft Resin (mass %) | A-1 | | | | | | | | | |
|   |   | A-2 | | | | | | | | | |
|   |   | A-3 | | | | | 80 | | | | |
|   |   | A-4 | 76 | 86 | 87 | 94 | | 80 | 90 | 95 | 100 |
|   |   | A-5 | | | | | | | | | |
| B | Hard Resin (mass %) | B-1 | | | | | | | | | |
|   |   | B-2 | | | | | 20 | | | | |
|   |   | B-3 | 20 | 10 | 10 | 5 | | 20 | 10 | | |
|   |   | B-4 | | | | | | | | | |
| C | Inorganic Filler (mass %) | C-1 | | | | | | | | | |
|   |   | C-2 | | | | | | | | | |
|   |   | C-3 | | | | | | | | | |
|   |   | C-4 | | | | | | | | | |
|   |   | C-5 | 4 | 4 | 3 | 1 | | | | 5 | |
|   | Shore Hardness | | 97 | 89 | 85 | 84 | 87 | 85 | 82 | 82 | 79 |
|   | Compression Permanent Deformation (%) | | 93 | 84 | 82 | 78 | 89 | 82 | 79 | 77 | 75 |
|   | Amount of Static Oil Leakage (cc) | Initial | 0.0 | 0.0 | 0.0 | 0.0 | 0.0 | 0.0 | 0.0 | 0.0 | 0.0 |
|   |   | After Running | 2.6 | 0.9 | 0.9 | 0.0 | 1.8 | 0.8 | 0.7 | 100 | 100 |

Example 18

A polyester resin/acrylic rubber-based dynamic crosslinked resin as a soft resin and a vinylidene fluoride resin as a hard resin were mixed by means of a twin screw extruder equipped with a screw with a diameter φ of 92 mm in combination with a lead and a kneading disc. The polyester resin/acrylic rubber-based dynamic crosslinked resin and vinylidene fluoride resin were each supplied by a side feeder, and mixed under a shear condition of a temperature of 240° C. and a screw rotation speed of 150 rpm to obtain pellets. As the polyester resin/acrylic rubber-based dynamic crosslinked resin and vinylidene fluoride resin, the above-described commercial products were used. The mass ratio (polyester resin/acrylic rubber-based dynamic crosslinked resin: vinylidene fluoride resin) was 90:10. The obtained pellets were injection-molded in the same manner as in Example 1 to produce various measurement samples. The surface hardness, compression permanent deformation, and amount of static oil leakage were measured. The size of seal ring of sample for measurement of the amount of static leakage was set so that the compression rate was 30% with the seal ring attached to the shaft groove. The results are shown in Table 2.

Figure 2:
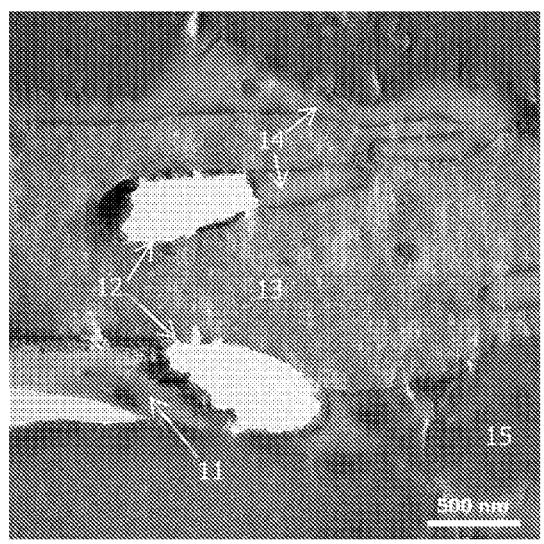
FIG. 2 is a TEM photograph of a sample in Example 18 (×40,000).

The structure of the obtained sample was observed with a transmission electron microscope (TEM). The measurement sample was prepared by $RuO_4$ staining and ultrathin section method. FIG. 2 shows a TEM photograph (×40,000).

Examples 19 and 20

Figure 3:
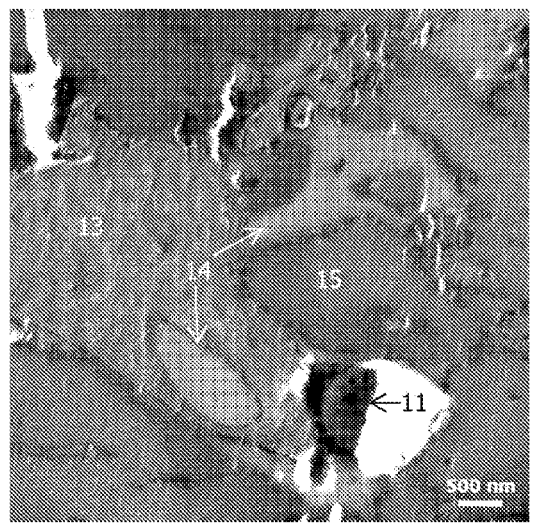
FIG. 3 is a TEM photograph of a sample in Example 19 (×40,000).
Figure 4:
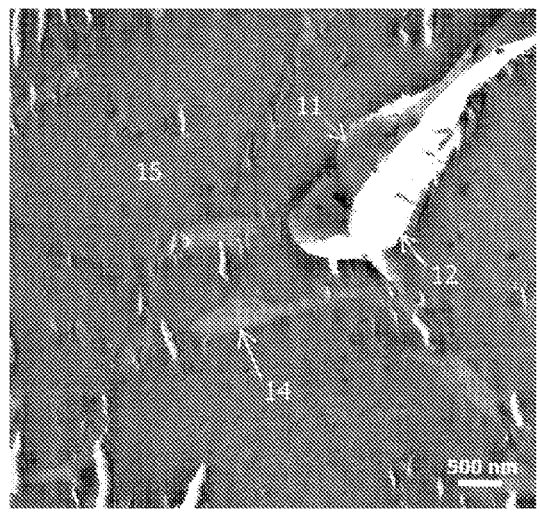
FIG. 4 is a TEM photograph of a sample in Example 20 (×40,000).

Measurement samples were prepared in the same manner as in Example 18 except that the screw rotation speed was changed into 250 rpm (Example 19) or 350 rpm (Example 20), and evaluated. The measurement results of the surface hardness, compression permanent deformation, and amount of static leakage of each sample are shown in Table 2. FIGS. 3 and 4 show TEM photographs of the samples in Examples 19 and 20, respectively (×40,000).

The compression permanent deformation was 79 in Example 18. The compression permanent deformation was decreased to 73 in Example 19. The compression permanent deformation was largely decreased to 60 in Example 20. Therefore, it was revealed that the intimate correlation of screw rotation speed and compression permanent deformation was seen. FIGS. 2, 3, and 4 show TEM photographs of the samples in Examples 18, 19, and 20, respectively. As shown in FIG. 2, in Example 18, a crystalline lamellar structure was observed in the interior portion and a B phase 13 assumed to be the polybutylene terephthalate component in the dynamic crosslinked resin was observed. In the interior portion of the B phase and a portion adjacent to the B phase, an A phase 11 was confirmed, which was a phase of a modified component of polybutylene terephthalate assumed to be a separation phase of the B phase. A white portion was considered to be an A-phase falling trace 12 in which the amorphous soft A phase 11 was fallen during processing of the sample into a ultrathin section. In the interior portion of the B phase 13, a C phase 14 having a semicrystalline structure was observed, which was considered to be a vinylidene fluoride resin phase. Around the B phase 13, a matrix phase 15 was recognized, which was considered to be made of an acrylic rubber component in the dynamic crosslinked resin. As shown in FIG. 2, the boundaries between the B phase 13 and the matrix phase 15 and between the B phase 13 and the C phase 14 were clearly confirmed. It was revealed that the respective layers were not compatible with each other.

In Example 19, a B phase 13 which was a polybutylene terephthalate component phase in the dynamic crosslinked resin, an A phase 11 which was a phase of a modified component of polybutylene terephthalate, a C phase 14 which was a vinylidene fluoride resin phase, and a matrix phase 15 which was an acrylic rubber phase were confirmed as in Example 18. Here, the boundary between the C phase 14 and the matrix phase 15 was unclear as compared with Example 18. This showed that an increase in a screw speed initiated compatibilization of both the phases.

Further, in Example 20, an A phase 11 and a C phase 14 were recognized, but a B phase was not recognized. Here, a matrix phase 15 around the A phase 11 and the C phase 14 is assumed to be a phase in which the dynamic crosslinked resin and the vinylidene fluoride resin are compatible.

Thus, in Example 20, the acrylic rubber component and the resin component were uniformly and finely dispersed by high shear. Therefore, it is considered that the compression permanent deformation may be largely decreased. This fine dispersion of each of the rubber component and the resin component would increase the specific surface area of each particle. As a result, the load applied to the unit area would be decreased, and the compressive stress would be uniformly distributed. Thus, it is assumed that the state returns to the original state with ease when the compressive load is released. Furthermore, when the screw speed is further increased, the crosslinking of the rubber component proceeds. Thus, the density is increased, and the rebounding elastic force is enhanced. This may be a cause of reduction in compression permanent deformation.

In Examples 18 to 20, even when the compression rate was 30%, excellent effect of preventing leakage in a no-load state was exerted. However, in Example 20, static leakage after running was not recognized. The compression permanent deformation of the mixture constituting the seal ring of the present invention, that is, the compression permanent deformation after immersion in an automatic transmission fluid at 150° C. for 100 hours, which is measured by the method described above, is preferably 80% or lower, more preferably 75% or lower, and further preferably 60% or lower.

TABLE 2

| | Soft Resin | Hard Resin | Screw Rotation | | Compression Permanent | Amount of Static Oil Leakage (cc) | |
|---|---|---|---|---|---|---|---|
| | A-3 (mass %) | B-3 (mass %) | Speed (rpm) | Shore Hardness | Deformation (%) | Initial | After Running |
| Example 18 | 90 | 10 | 150 | 83 | 79 | 0.0 | 0.9 |
| Example 19 | 90 | 10 | 250 | 90 | 73 | 0.0 | 0.2 |
| Example 20 | 90 | 10 | 350 | 94 | 60 | 0.0 | 0.0 |

REFERENCE SIGNS LIST

3 Shaft
4 Housing
6 O ring
11 Modified component (A phase) of polyester resin (polybutylene terephthalate) in dynamic crosslinked resin
12 A-phase falling trace
13 Unmodified component (crystalline component: B phase) of polyester resin (polybutylene terephthalate) in dynamic crosslinked resin
14 Vinyliden fluoride resin (C phase)
15 Matrix phase

The invention claimed is:

1. A seal ring used in a continuously variable transmission, the seal ring comprising a mixture containing a soft resin comprising a dynamic crosslinked resin in which an acrylic rubber is dispersed in a polyester resin phase, a hard resin comprising a thermoplastic resin, and carbon nanotubes, wherein the hard resin is a vinylidene fluoride resin.

2. The seal ring used in a continuously variable transmission according to claim 1, wherein a compression permanent deformation of the mixture after immersion in an automatic transmission fluid at 150° C. for 100 hours is 95% or lower.

3. The seal ring used in a continuously variable transmission according to claim 1, wherein the mixture further contains at least one selected from the group consisting of fibrous glass, carbon fibers, molybdenum bisulfide, graphite, and carbon powder.

4. The seal ring used in a continuously variable transmission according to claim 2, wherein the mixture further contains at least one selected from the group consisting of fibrous glass, carbon fibers, molybdenum bisulfide, graphite, and carbon powder.

* * * * *